United States Patent [19]

Sutton

[11] Patent Number: 5,428,757
[45] Date of Patent: Jun. 27, 1995

[54] METHOD FOR REDUCING TRANSLATION LOOK ASIDE BUFFER PURGES IN A MULTITASKING SYSTEM

[75] Inventor: Peter G. Sutton, Yorktown Heights, N.Y.

[73] Assignee: International Business Machines Corporation, Armonk, N.Y.

[21] Appl. No.: 875,514

[22] Filed: Apr. 29, 1992

[51] Int. Cl.6 ........................ G06F 12/10; G06F 12/08
[52] U.S. Cl. .................................... 395/400; 395/425; 364/DIG. 1; 364/256.4
[58] Field of Search ................................ 395/400, 425

[56] References Cited

U.S. PATENT DOCUMENTS

| 4,068,303 | 1/1978 | Morita | 395/400 |
| 4,326,248 | 4/1982 | Hinai et al. | 395/400 |
| 4,456,954 | 6/1984 | Bullions, III et al. | 395/400 |
| 4,525,778 | 6/1985 | Cane | 395/425 |
| 4,682,281 | 7/1987 | Woffinden et al. | 395/400 |
| 4,733,348 | 3/1988 | Hiraoka et al. | 395/425 |
| 4,757,447 | 7/1988 | Woffinden | 395/400 |
| 4,779,188 | 10/1988 | Gum et al. | 395/500 |
| 4,849,881 | 7/1989 | Eguchi | 395/425 |
| 5,317,705 | 5/1994 | Gannon et al. | 395/400 |

FOREIGN PATENT DOCUMENTS 0327798 8/1989 European Pat. Off. .

OTHER PUBLICATIONS

IBM Technical Disclosure Bulletin, vol. 20, No. 5, Oct. 1977 "Segment Table Orgin Stack", Gannon and Sy, pp. 1863–1864.
IBM Technical Disclosure Bulletin, vol. 21, No. 6, Nov. 1978 "Efficient Directory Lookaside Table", Gannon and Sy, pp. 2465–2467.
P. M. Gannon et al., "Apparatus and Method for TLB Purge Reduction in a Multi-Level Machine System", U.S. Application Serial No. 08/112,174 filed 8/26/93.

Primary Examiner—David L. Robertson
Assistant Examiner—Reginald Bragdon
Attorney, Agent, or Firm—William A. Kinnaman

[57] ABSTRACT

A process for reducing translation look-aside buffer (TLB) purge overhead does so by purging the TLB only when required to avoid invalid entries. The translation look-aside buffer (TLB) contains virtual to real mappings for a particular address space. Operating systems commonly purge the TLB whenever a new task is dispatched to ensure the TLB entries are valid. A system with relatively short tasks will incur significant overhead by this practice. The present invention detects those situations where a purge is required by associating TLB purge with the address space allocation logic. Invalid TLB entries will exist only where an address space is re-used by a different task. The address space allocation logic is modified to place a marker indicating a TLB purge in the queue of free address space blocks. Whenever the marker rises to the head of the queue a TLB purge is issued. Task dispatches at all other times do not require TLB purging.

8 Claims, 2 Drawing Sheets

METHOD FOR REDUCING TRANSLATION LOOK ASIDE BUFFER PURGES IN A MULTITASKING SYSTEM

BACKGROUND OF THE INVENTION

1. Field of the Invention

The present invention relates to electronic digital processing systems and, more particularly, to data processing systems which employ virtual memory addressing. More particularly, the present invention is directed to a method for reducing operating system overhead caused by translation look aside buffer purging.

2. Description of the Prior Art

Computer systems implement virtual memory systems to more effectively manage real computer memory for computer tasks. Virtual memory is typically organized as a series of memory pages of fixed size, for example, 4096 bytes. Memory pages in turn, are grouped into segments. A virtual memory address comprises three fields as shown in FIG. 1. The segment index 100 is used to access a segment table to determine the real location of a segment containing several pages. Page index 102 is an index to access a particular page within that segment, and offset 104 provides the location of data within that particular page.

During task processing virtual addresses must be translated to real addresses for memory access to occur. Virtual to real address translation is carried out by a dynamic address translation mechanism 202 as shown in FIG. 2. Dynamic address translation typically requires two memory accesses: to the segment table and to the page table, before the real address can be calculated and the memory accessed for data. The result of dynamic address translation is a real address that can be used by the processor to access real memory.

Performing dynamic address translation for every virtual memory access greatly increases processing overhead. It is highly desirable to reduce the number of memory accesses and instruction path length required for address translation. Computer system designers have made the address resolution process more efficient by introducing a translation look aside buffer (TLB). A translation look aside buffer (208 in FIG. 2) typically contains a fixed number of entries, e.g. 256. Each TLB entry provides a direct translation from a virtual address to a real address. A typical TLB entry is shown in FIG. 3. The first field 230 is the segment table origin (STO) indicating the origin of the allocated segment table. Virtual address 232 contains the segment index (sx), page index (px), and offset (bx) as shown in FIG. 1. Real address 234 contains the real memory address used for accessing the data.

In operation, the processor initially performs dynamic address translation to determine the real address for a particular virtual address. The resolved entry is then added to the translation look aside buffer (TLB) 208. When future address resolution requests are made, the TLB is first checked to determine whether or not it contains an entry resolving that particular virtual address. If the virtual address is not already in the TLB, then dynamic address translation must be performed and a new TLB entry created and added to the TLB possibly casting out an older entry.

The TLB entries are only valid for translations within a particular segment table. Different segment tables may result in different virtual to real conversions. Without a mechanism to differentiate between TLB entries of different segment tables, the TLB must be purged at every task dispatch to prevent invalid address translations. Typically, the segment table origin is maintained in the TLB to associate a virtual to real conversion with the appropriate segment table.

A segment table origin (STO) defines an address space. An address space will typically persist through one or more dispatches. Each time the address space is dispatched, the TLB may have some entries left over from the previous execution of the address space which will improve performance since the initial address translation is not required. Eventually the use of address space will terminate, though it may later be reused. The virtual to real translations in the TLB will not be valid for subsequent uses of the address space.

At each address space dispatch, the contents of the TLB may or may not be valid, depending on whether the address space has been reused since the last time it was dispatched.

The processing overhead cost to purge the TLB is determined by comparing the time to purge to the length of tasks running on the computer system. The overhead to purge the TLB before task initiation is insignificant for very long running tasks. However, for a very short running task, the purge TLB overhead may constitute a significant portion of the task operating elapsed time. Thus, the requirement to frequently purge TLB adds undesired overhead to the system and reduces processor throughput. This penalty is particularly severe in short task, transaction processing systems.

Various methods have been suggested to reduce the need to purge the translation look aside buffer. U.S. Pat. No. 4,525,778 to Cane suggests the use of tag bits and a process identifier with each TLB entry. An address resolution access to the TLB must compare the tag bits and process identifier to determine whether this TLB entry is valid for the accessing process. If not, the entry is invalidated. Other such systems have been proposed to add marking bits to the TLB which are then compared upon TLB access.

The use of additional bits to mark each TLB entry adds logic overhead to the processing system. It would be desirable to avoid adding hardware or software to set and test the additional flags. It is therefore desirable to develop a TLB management system that reduces the instance of translation look aside buffer purges without adding hardware to the TLB accessing circuit.

The technical problem that must be resolved is to provide a system that minimizes TLB while assuring that address resolution accesses to always result in valid addresses.

SUMMARY OF THE INVENTION

The present invention is directed to providing an improved TLB purging system which reduces the number of instances of TLB purges. The present invention uses the address space allocation mechanism in conjunction with the TLB management mechanism to reduce the number of purge TLB instructions. Address spaces are allocated from a FIFO managed list of address spaces. A de-allocated address space block is placed on the bottom of the list of free address spaces. A marker is placed at the bottom of the free address space list at system initialization. When that marker reaches the top of the queue, the TLB is purged and the marker is moved to the bottom of the list. No TLB purges occur during intervening address space allocations.

DETAILED DESCRIPTION OF THE PREFERRED EMBODIMENT

Figure 1:
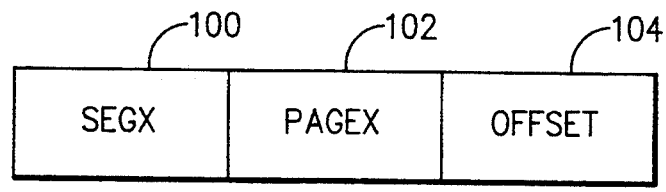
FIG. 1 shows the structure of a virtual address of the prior art.
Figure 3:
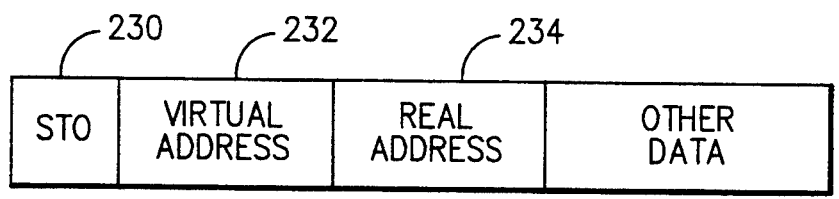
FIG. 3 is an example of a translation look aside buffer entry of the prior art.
Figure 4:
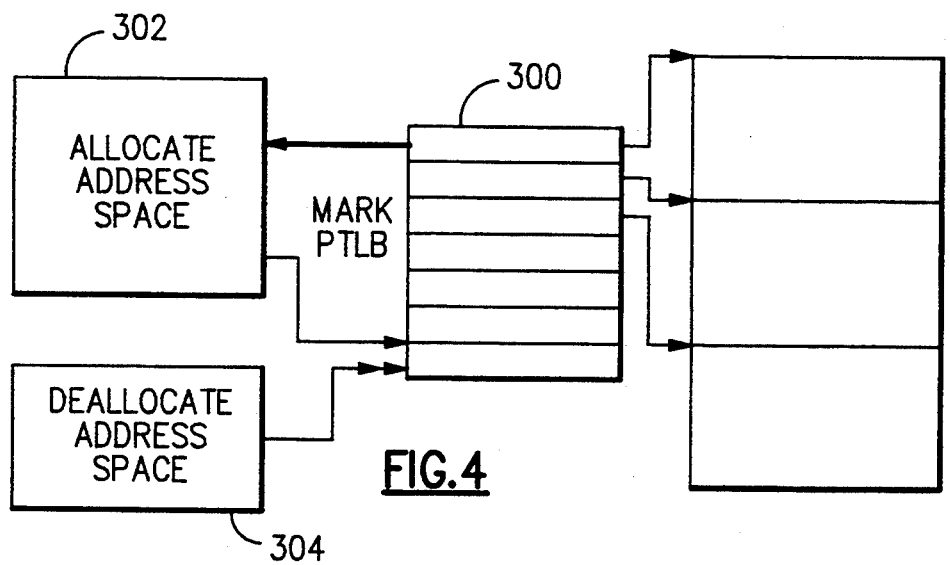
FIG. 4 is a block diagram showing address and space allocation logic according to the present invention.
Figures 2, 5:
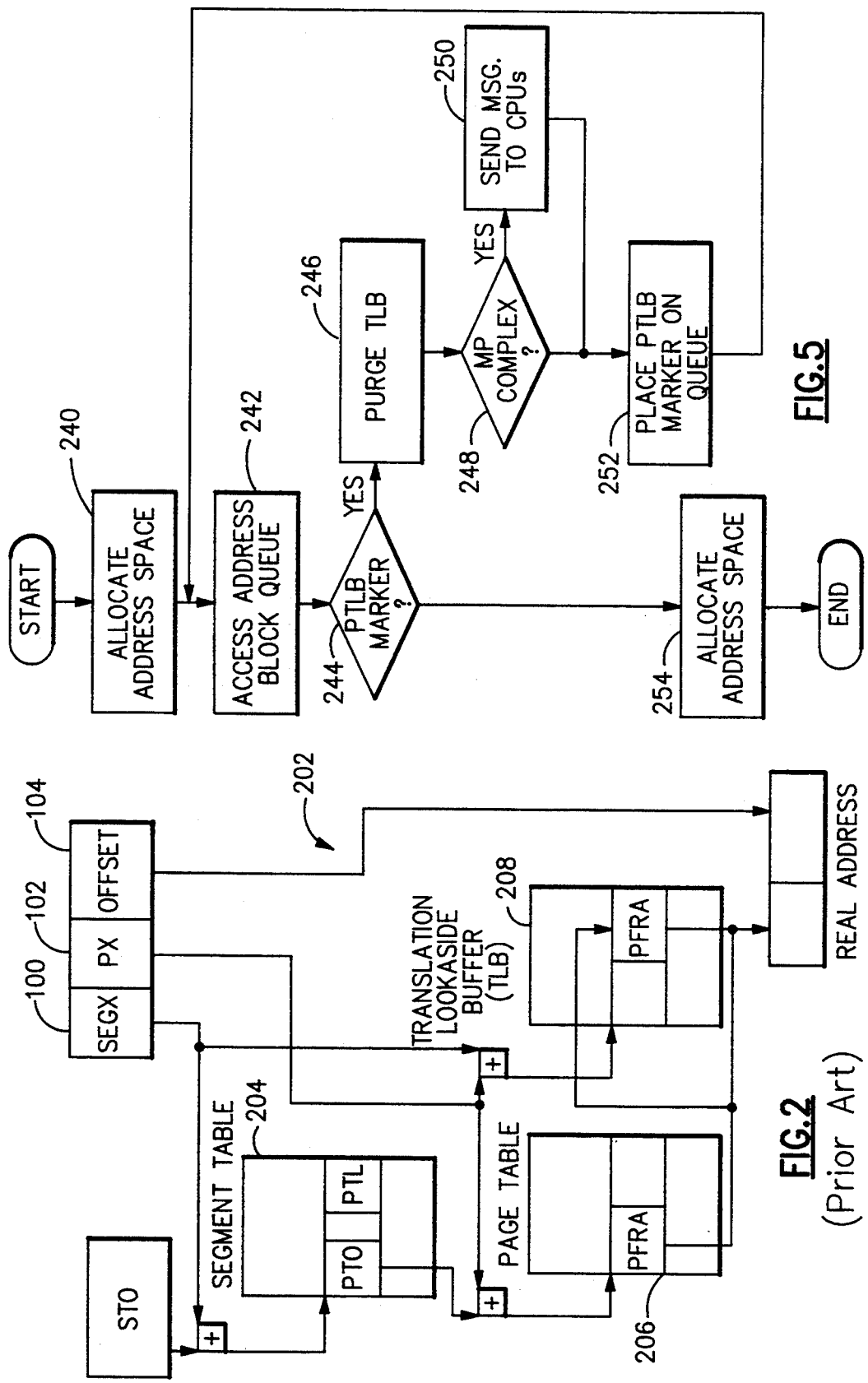
FIG. 2 is a block diagram illustrating the virtual address resolution logic in a computer system of the prior art.
FIG. 5 is a diagram of the allocation process according to the present invention.

Virtual address resolution requires the determination of a real address based on segment table, page table and offset locations for a virtual address as shown in FIG. 2 and discussed in greater detail above. The segment table origin (STO) is established during the address space allocation process. Address spaces are allocated to operating tasks from a list of free address space blocks, as shown in FIG. 4. An address space refers to the range of addresses a program or task may use. In a virtual memory system the address space of a particular program may refer to a different physical system or other programs. The operating system typically builds a fixed number of potential address spaces at system initialization. These prebuilt address spaces are dynamically allocated, as needed, from a list of available address spaces.

Whenever an address space is in use, that address space block is in use. Free address space blocks containing pointers to address space origins are maintained in the address space block queue 300. The address allocation process 302 removes the first block from the address space block list, and uses that address space origin as the segment table origin for the operating task. When an address space is de-allocated, the address space block is returned to the end of the queue.

TLB entries table 208 are valid only within a particular address space. TLB entries can cause problems only if the address space that is about to be dispatched was previously used and left entries in the TLB. In that case the STO and virtual addresses could match TLB entries but would point to invalid real addresses. If the address space was used by a different task, invalid translations of virtual to absolute addresses would occur. Thus, the system must assure that the TLB is purged before an address space is reused. If the TLB is purged as required, the system can be assured that the TLB is valid.

The address space allocation mechanism is used by the present invention to minimize the number of TLB purges. The present invention adds a process to check to ensure that the TLB has been purged before an address space is re-used. This process is implemented by placing a marker in the address space queue at initialization and whenever the TLB is purged. The marker is placed at the end of the queue and, as address spaces are allocated and de-allocated, eventually rises to the top of the queue. When the address space allocation mechanism detects the marker at the top of the queue "purge TLB" (PTLB) instruction is executed.

The preferred embodiment places a fullword 0 as a marker on the list of available address spaces. Each block removed from the list of available address spaces is tested to determine if it is 0. If so, the process managing the list of address spaces executes PTLB logic, returns the marker to the bottom of the list and removes the next item from the list. Address list processing logic must be modified to recognize that a list containing only a marker is an empty list.

In alternate embodiments the marker may be formed by placing any unambiguous value in the address space list or by changing the address space queue structure to include an extra field representing the marker. Any of the many known techniques for adding a marker to a list may be employed and are all within the scope of this invention.

A multi-processing system with multiple tightly coupled CPU's will maintain a TLB in each CPU even though they may be accessing shared storage. Thus, in a multi-processing system the purge TLB instruction will have to be propagated to the other processors in the multi-processor complex.

Although the above-described process will work in most situations, there are certain instances where it cannot be used. Where a common segment is created conflicting virtual to real mappings can occur and the TLB must be purged at each task dispatched. Common segments are provided in some operating systems to provide one virtual to real address translation for virtual addresses from different address spaces. The system must either manage these translations to ensure consistency or purge the TLB between dispatches of address spaces that have conflicting common areas.

The novel TLB management procedure of the present invention operates according to the process illustrated in FIG. 5. An allocate address space request is received from the operating system 240. This request may be due to the receipt of a message to be processed, a request for specific system services requiring their own address space, a request by an application for explicit address space assignment, or other timed or non-timed address space freelist. The allocation of address spaces depends on the individual operating system design.

Figure 6:
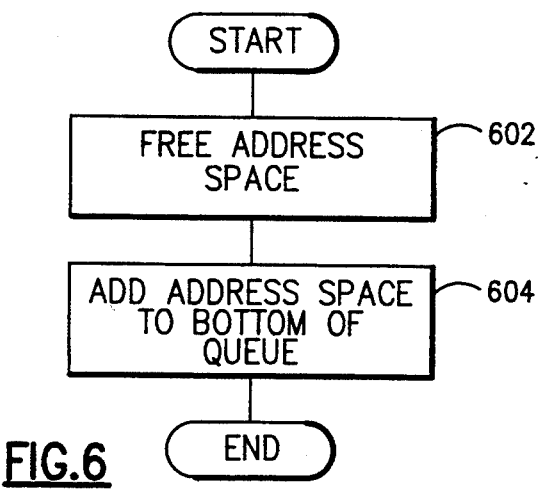
FIG. 6 is a diagram of the deallocation process according to the present invention.

Address block queue 300 is accessed 242. If PTLB marker is detected 244, a purge TLB instruction is issued 246. If this is an MP complex 248, a PTLB message is sent to the other CPU's 250. In either case, a PTLB marker is placed at the bottom of the address queue 252 and control returns to step 242 where the next address space block is accessed. If no PTLB marker is detected the address space is allocated 254. Address space deallocation (FIG. 6) performs the work necessary to free the address space step 602. This may include collecting account data, returning resources used by the process to the system. Once the deallocation work is complete, a contact block marker as described above, is placed on the list of free spaces step 604 (the FIFO address queue).

It will be understood from the foregoing description that various modifications and changes may be made in the preferred embodiment of the present invention without departing from its true spirit. It is intended that this description is for the purposes of illustration only and should not be construed in a limiting sense. The scope of this invention should be limited only by the language of the following claims:

I claim:

1. A virtual memory management system for a computer system having at least one processor and memory having a plurality of address spaces, said at least one processor executing a plurality of tasks, each task referencing locations in one of said plurality of address spaces using a virtual address reference, said virtual memory management system comprising:

address space allocation means for allocating one of said plurality of address spaces to one of said plurality of tasks, said address space allocation means including a queue of available address spaces having an entry for each available address space, said address space allocation means examining entries in said queue to determine a next available address space and assigning said next available address space from said queue to said one of said plurality of tasks upon task initiation;

address translation means for translating a virtual address reference to a real address reference, said address translation means including a translation look-aside buffer containing virtual to real address translations for a finite number of virtual addresses;

translation look-aside buffer purge means for purging said translation look-aside buffer, said translation look-aside buffer purge means inserting a purge marker in said queue whenever said translation look-aside buffer is purged; and purge request means responsive to the detection of a purge marker by said address space allocation means upon examining the corresponding queue entry for activating said translation look-aside buffer purge means.

2. The virtual memory management system of claim 1 in which said computer system has a plurality of processors, each of which has an associated translation look-aside buffer, said virtual memory management system further comprising:

means for communicating translation look-aside buffer purge requests from said at least one processor to the remainder of said plurality of processors.

3. The virtual memory management system of claim 1, further comprising address space deallocation means for deallocating an address space and adding an entry for said deallocated address to the end of said queue.

4. A method for managing translation look-aside buffers in a computer system having at least one processor and real memory partitioned into a plurality of address spaces, said method comprising the steps of:

storing a pointer to each of said address spaces in an address space queue;

placing a translation look-aside buffer purge marker at the end of said address space queue;

accessing a next entry in said address space queue to allocate an available address space to a task;

testing said entry to determine whether said entry is a translation look-aside buffer purge marker and, if so:

issuing a purge translation look-aside buffer instruction;

placing a translation look-aside buffer purge marker at the end of said address space queue; and returning to said accessing step;

otherwise, allocating the address space designated by said address space queue entry.

5. The method of claim 4, further comprising the steps of:

deallocating said address space upon completing the task to which it has been allocated; and adding a pointer pointing to said deallocated address space to said address space queue upon the deallocation of said address space from said task.

6. The method of claim 4 in which said computer system has a plurality of processors sharing said real memory, each of which has an associated translation look-aside buffer, said method further comprising the step of:

upon issuing said purge translation look-aside buffer instruction, transmitting said purge translation look-aside buffer instruction from said at least one processor to all other processors of said plurality of processors sharing said real memory.

7. A method of minimizing translation look-aside buffer purge overhead in a computer system having at least one processor, real memory partitioned into a plurality of address spaces that are allocated to tasks and later deallocated from said tasks when said tasks are completed, and a translation look-aside buffer for translating virtual addresses to real memory addresses, the method comprising the steps of:

maintaining a queue of entries corresponding to available address spaces that are removed from said queue when said address spaces are allocated to tasks and returned to said queue when said address spaces are deallocated from tasks;

testing when removing an entry from said queue to determine whether said entry is a purge marker and, if so, purging said translation look-aside buffer and adding a new purge marker to the end of said queue to indicate when said purge was performed.

8. The method of claim 7 in which said computer system has a plurality of processors sharing said real memory, each of which has an associated translation look-aside buffer, said method further comprising the step of:

upon purging said translation look-aside buffer, sending a message to each processor sharing memory within said computer system instructing them to purge their translation look-aside buffers.

* * * * *